(12) United States Patent
Al-Haj Ali (10) Patent No.: US 11,078,305 B2
(45) Date of Patent: Aug. 3, 2021

(54) METHOD OF REDUCING THE ENTRAINMENT OF POLYMER IN THE POLYMER-LEAN LIQUID PHASE OF A SEPARATOR

(71) Applicant: Borealis AG, Vienna (AT)

(72) Inventor: Mohammad Al-Haj Ali, Porvoo (FI)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 16/624,390

(22) PCT Filed: Jun. 22, 2018

(86) PCT No.: PCT/EP2018/066788
§ 371 (c)(1),
(2) Date: Dec. 19, 2019

(87) PCT Pub. No.: WO2019/002137
PCT Pub. Date: Jan. 3, 2019

(65) Prior Publication Data
US 2020/0123282 A1   Apr. 23, 2020

(30) Foreign Application Priority Data
Jun. 29, 2017   (EP) .................................. 17178698

(51) Int. Cl.
| C08F 6/00 | (2006.01) |
| B01D 17/02 | (2006.01) |
| B01D 19/00 | (2006.01) |
| C08F 2/01 | (2006.01) |
| C08F 2/06 | (2006.01) |

(52) U.S. Cl.
CPC .............. C08F 6/003 (2013.01); B01D 17/02 (2013.01); B01D 19/0042 (2013.01); C08F 2/01 (2013.01); C08F 2/06 (2013.01)

(58) Field of Classification Search
CPC ..... C08F 6/003; C08F 2/01; C08F 2/06; B01D 17/02; B01D 19/0042; C08L 23/0815
USPC .......................................................... 526/68
See application file for complete search history.

(56) References Cited

U.S. PATENT DOCUMENTS

| 3,781,253 A * | 12/1973 | Mori et al. ............ C08F 4/6548 |
| | | 526/124.2 |
| 2005/0192416 A1 | 9/2005 | Friedersdorf |
| 2015/0073106 A1 | 3/2015 | Friedersdorf |

OTHER PUBLICATIONS

International Search Report for PCT/EP2018/066788, dated Sep. 25, 2018.

* cited by examiner

*Primary Examiner* — William K Cheung
(74) *Attorney, Agent, or Firm* — Fay Sharpe LLP (57) ABSTRACT

The present invention relates to a method of reducing the entrainment of polymer in the polymer-lean liquid phase in a separator, comprising the steps of: (i) Selecting the diameter of the polymer droplets in the polymer solution entering the separator; (ii) Determining the traveling time of the polymer droplets in the separator; and (iii) Adjusting the residence time of the polymer-dense phase in the separator to be at least the traveling time of the polymer droplets, a solution polymerization process using said method for reducing the entrainment of polymer in the polymer-lean liquid phase in the separator and the use of said method for determining the minimum residence time of the polymer solution in the separator required to ensure efficient separation of a polymer solution into a polymer-lean phase and a polymer-rich phase.

14 Claims, 3 Drawing Sheets

METHOD OF REDUCING THE ENTRAINMENT OF POLYMER IN THE POLYMER-LEAN LIQUID PHASE OF A SEPARATOR

This is a 371 of PCT/EP2018/066788, filed Jun. 22, 2018, which claims priority to European Patent Application No. 17178698.1, filed Jun. 29, 2017, the contents of which are fully incorporated herein by reference.

FIELD OF THE INVENTION

The present invention relates to a method of reducing the entrainment of polymer in the polymer-lean liquid phase in a separator by means of adjusting the residence time of the polymer solution in the separator to be at least the traveling time of the polymer droplets wherein the traveling time depends, amongst others, on the particle size of the polymer droplets in the separator.

PROBLEM TO BE SOLVED

It is known to produce olefin polymers in solution polymerization process where the unreacted monomer and comonomer and the solvent are separated from the solution and recycled to the polymerization process.

In principle two different ways to separate the unreacted monomer and comonomer and the solvent are separated from the solution are known in the art.

Figure 1:
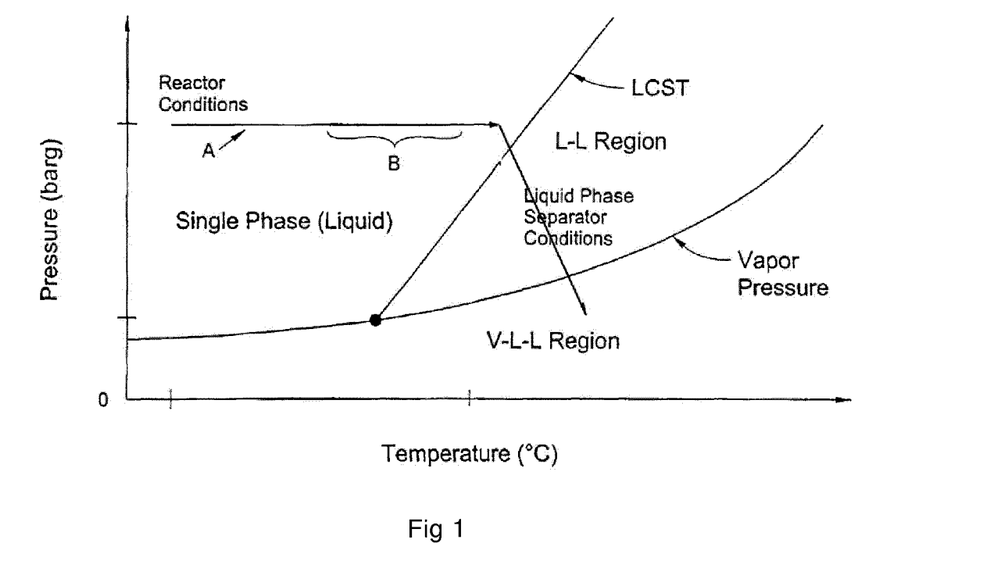

PCT/EP2016/082207 and PCT/EP2016/082184 both disclose solution polymerization processes in which the separation is conducted in a vapour-liquid separator, in which the unreacted monomer and comonomer and the solvent are separated as vapour stream from the liquid solution stream which includes the polymer. This method has the advantage of a clean separation in which substantially no polymer is entrained in the vapour stream so that the vapour stream can be recycled in the polymerization reactor without further processing steps. The drawback of this method is a high energy consumption as for obtaining a separation of a vapour stream and a liquid stream the temperature and the pressure of the polymer solution has to be decreased below the lower critical solution temperature (LCST) as can be seen in the phase diagram of FIG. 1.

Figure 2:
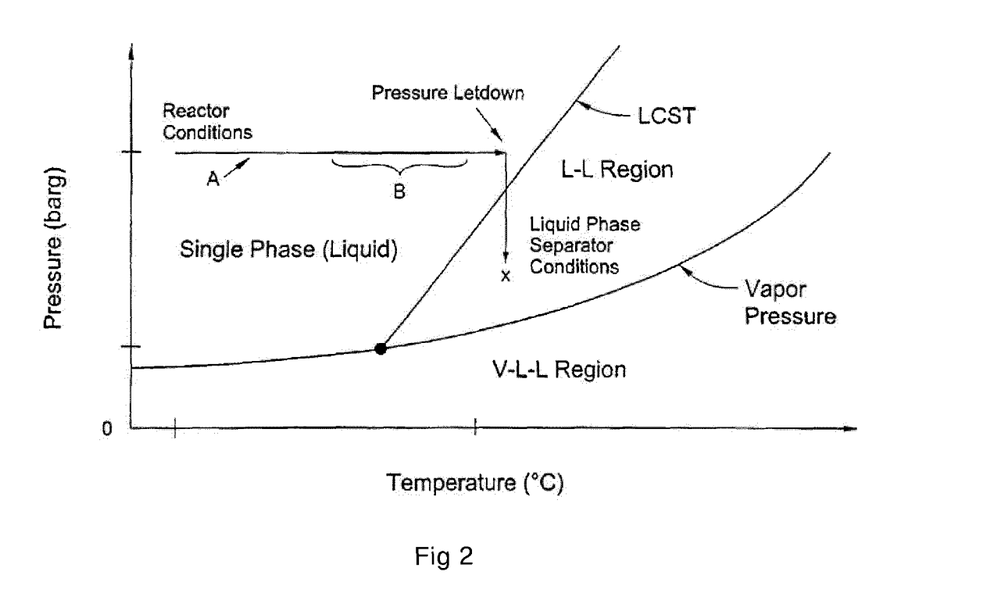

U.S. 2005/0192416, WO 2008/082511, U.S. 2009/0259005 and U.S. 2015/0073106 all describe solution polymerization processes in which the separation is conducted in a liquid-liquid separator, in which the unreacted monomer and comonomer and the solvent are separated as liquid stream from the liquid solution stream which includes the polymer. This method has the advantage of lower energy consumption compared to vapour-liquid separation as the temperature and pressure decrease is lower as can be seen in the phase diagram of FIG. 2. However, liquid-liquid separation has the drawback of polymer entrainment in the polymer-lean liquid phase so that before recycling the polymer-lean liquid phase into the polymerization reactor several further processing steps for separating the entrained polymer have to be conducted.

Thus, there is a need in the art for a method of separating the unreacted monomer and comonomer and the solvent are separated from the solution which reduces polymer entrainment in the polymer-lean phase and is energy efficient.

The present invention is based on the finding that by adjusting the residence time of the polymer droplets in the polymer solution in the separator to the diameter of the polymer droplets the polymer entrainment in the polymer-lean liquid phase can be significantly reduced.

SUMMARY OF THE INVENTION

In a first aspect the present invention provides a method of reducing the entrainment of polymer in the polymer-lean liquid phase in a separator, comprising the steps of:
(i) Setting the diameter range of the polymer droplets in the polymer solution entering the separator;
(ii) Estimating the traveling time of the polymer droplets in the separator; and
(iii) Adjusting the residence time of the polymer solution in the separator to be at least the traveling time of the polymer droplets.

In a second aspect the present invention provides a process for producing a polymer comprising the steps of:
(a) Continuously polymerizing a monomer and optionally at least one comonomer in a solvent in a polymerization reactor to produce a polymer solution comprising the solvent, the polymer, unreacted monomer and optionally unreacted comonomer;
(b) Continuously withdrawing the polymer solution from the polymerization reactor;
(c) Heating the polymer solution;
(d) Reducing the pressure of the heated polymer solution by an amount sufficient to separate the polymer solution into a polymer-rich liquid phase comprising the polymer and a polymer-lean liquid phase comprising the solvent, the unreacted monomer and optionally the unreacted comonomer;
(e) Feeding the pressure-reduced polymer solution into a separator;
(f) Reducing the entrainment of the polymer in the polymer-lean liquid phase according to the method as described above or below;
(g) Withdrawing the polymer-rich liquid phase from the separator and recovering the polymer from the polymer-rich liquid phase; and
(h) Withdrawing the polymer-lean liquid phase from the separator and directly recycling the polymer-lean liquid phase into the polymerization reactor.

In a third aspect the present invention provides the use of the method of reducing the entrainment of polymer in the polymer-lean liquid phase in a separator as described above or below for determining the minimum residence time of the polymer solution in the separator required to ensure efficient separation of a polymer solution into a polymer-rich phase comprising the polymer and a polymer-lean phase comprising solvent, unreacted monomer and optionally unreacted comonomer with the maximum fraction of polymer collected in the polymer-rich phase.

DESCRIPTION OF THE FIGURES

FIG. 1 shows the phase diagram showing the phase changes which take place in vapour-liquid separators. FIG. 1 was adopted from FIG. 2 of WO 2002/034795 A1.

FIG. 2 shows the phase diagram showing the phase changes which take place in liquid-liquid separators. FIG. 2 was adopted from FIG. 2 of WO 2002/034795 A1.

DEFINITIONS

Due to its specific weight the polymer agglomerates in the polymer solution to polymer droplets. The agglomeration process is accelerated by the reduction of the temperature and the pressure of the polymer solution withdrawn from the polymerization reactor before entering the separator.

The diameter of the polymer droplets in the polymer solution is approximated by the diameter of the distributor inside the separator. In general, the average droplet size in separation units depends on different facts: (a) distributor nozzle type, (b) the physical properties (e.g., viscosity, density, interfacial tension, etc.) of the dispersed phase, (c) the operating conditions (e.g., temperature, pressure, feed mass flow rate, etc.) in the separator and (d) the geometric characteristics of the separation unit. Since the polymer droplets in the polymer solution have spherical shape the diameter of the polymer droplets as used in the present application defines the minimum diameter of the spherical droplets.

Diameter range in this context means the range of diameter of the spherical droplets from their minimum diameter to their maximum diameter.

The traveling time is the total amount of time the polymer droplets take to gravitate through the polymer-lean phase having a low relative density into the polymer-rich phase having a higher relative density in the separator at a given temperature and pressure.

The residence time is the total amount of time the polymer droplets reside in the separator.

The terminal velocity in general is the velocity at which a falling body moves through a medium when the force of resistance, i.e. both buoyancy and drag forces, of the medium is equal in magnitude and opposite in direction to the force of gravity. The termination velocity $u_T$ is calculated according to formula (I):

$$u_T = \sqrt{\frac{4g(\rho_d - \rho_f)d_p}{3\rho_f CD}} \quad (I)$$

with the droplet density $\rho_d$, the fluid density $\rho_f$, the droplet diameter and the Drag Coefficient CD determined from the Reynolds number Re according to the following formula:

$$CD = \frac{24}{Re}[1 + 0.173 Re^{0.657}] \quad (II)$$

(MacCabe, W., Smith, J., Harriot, P., Unit Operations of Chemical Engineering, Mcgraw-Hill College, 5$^{th}$ Edition, pages 143-180).

The droplet density $\rho_d$ thereby denotes the relative density of the polymer droplets and is preferably in the range of 600 to 1000 kg/m$^3$. The fluid density $\rho_f$ denotes the relative density of the polymer-lean phase and is preferably in the range of 350 to 700 kg/m$^3$ for a polymer-lean liquid phase and less than 100 kg/m$^3$ for a polymer-lean vapour phase. The droplet diameter is preferably being determined according to any step (i) of the method of the invention.

A liquid-liquid separator relates to a vessel in which a two-phase liquid system can be separated. The liquid phase with the lower relative density (in the present case the polymer-lean liquid phase) is withdrawn from the upper end of the vessel whereas the liquid phase with the higher relative density (in the present case the polymer-rich liquid phase) is withdrawn from the bottom end of the vessel.

A vapour-liquid separator relates to a vessel in which a two-phase vapour-liquid system can be separated. The vapour phase with the lower relative density (in the present case the polymer-lean vapour phase) is withdrawn from the upper end of the vessel whereas the liquid phase with the higher relative density (in the present case the polymer-rich liquid phase) is withdrawn from the bottom end of the vessel.

Liquid-liquid separators and vapour-liquid separators are commonly used for separating polymer solutions produced in solution polymerization processes.

A polymerization reactor suitable in the process according to this invention can be any reactor suitable for polymerization which can be operated in continuous mode. Such reactors are well known in the art. Suitable examples are, amongst others, autoclave or stirred tank reactors operating in continuous mode or tubular reactors.

The polymer-lean phase of a two phase system of a polymer solution has a lower relative density than the polymer-rich phase and contains unreacted monomer, solvent and possibly traces polymer as well as heavy comonomer if present. The relative density is usually in the range of less than 100 kg/m$^3$ for a polymer-lean vapour phase and 350 to 700 kg/m$^3$ for a polymer-lean liquid phase, depending on the temperature and pressure.

The polymer-rich phase of a two phase system of a polymer solution has a higher relative density than the polymer-lean phase and contains the polymer and heavy comonomer if present and possibly traces of unreacted monomer and solvent.

DETAILED DESCRIPTION OF THE INVENTION

Method for Reducing the Entrainment of Polymer in the Polymer-Lean Liquid Phase

The present invention provides a method of reducing the entrainment of polymer in the polymer-lean liquid phase in a separator, comprising the steps of:

(i) Setting the diameter range of the polymer droplets in the polymer solution entering the separator;

(ii) Estimating the traveling time of the polymer droplets in the separator; and (iii) Adjusting the residence time of the polymer solution in the separator to be at least the traveling time of the polymer droplets.

As discussed above under definitions the droplet diameter of a polymer in a polymer solution usually depends on physical properties of the dispersed phase and thus on the characteristics of the polymer and increases with its weight average molecular weight and its comonomer content.

The droplet diameter range (or droplet distribution) is controlled by the mechanism of droplet formation, the physical properties of the liquid and the characteristics of the system piping. Different liquid distributors can be used including simple configurations such as central open feedpipe, or one fitted with a spray nozzle. More elaborated distributors such as pipe manifold distributor can also be used, see for instance the book "Chemical Engineering Design: Chemical Engineering Volume 6 (Chemical Engineering Series)", 4th edition, e.g. page 630. The polymer droplets pass, preferably gravitate, through the holes of the distributor into the polymer-rich liquid phase. Preferably, all the holes of the distributor have the same size and are of circular shape. Polymer droplets having a diameter equal or less than the diameter of the hole of the distributor pass, preferably gravitate, through the holes. The diameter of the holes of the distributor is usually at least 1000 µm, more preferably at least 750 µm, more preferably at least 500 µm, more preferably at least 250 µm, more preferably at least 100 µm and most preferably at least 75 µm.

Preferably the diameter of the polymer droplets is at least 50 µm, preferably at least 75 µm, most preferably at least 100 µm and usually not more than 1000 µm, preferably not more than 750 µm, most preferably not more than 500 µm.

The traveling time of the polymer droplets in the separator is preferably estimated from the termination velocity of the polymer droplets. Thereby, the traveling time is preferably the ratio of the height of the separator to the termination velocity.

From the above described definition of the termination velocity it becomes clear that the termination velocity and consequently the traveling time is dependent on the droplet diameter as such that the traveling time decreases with increasing droplet diameter.

The termination velocity preferably is at least 0.001 m/s, preferably at least 0.005 m/s and most preferably at least 0.01 m/s and usually not higher than 1.5 m/s, preferably not higher than 1.0 m/s.

Thereby, in a liquid-liquid separation the termination velocity is usually lower than in a vapour-liquid separation due to the lower difference of relative densities of the polymer-lean liquid phase and the polymer-rich liquid phase compared to the difference of relative densities of the polymer-lean vapour phase and the polymer-rich liquid phase.

The termination velocity in liquid-liquid separation preferably is at least 0.001 m/s, more preferably at least 0.005 m/s and most preferably at least 0.01 m/s and usually not higher than 0.1 m/s.

The termination velocity in vapour-liquid separation preferably is at least 0.01 m/s, more preferably at least 0.05 m/s and most preferably at least and 0.07 m/s and usually not higher than 1.5 m/s, preferably not higher than 1.0 m/s.

According to the method of the invention the polymer entrainment in the polymer-lean liquid phase can be significantly reduced by adjusting the residence time of the polymer solution in the separator to be at least the traveling time of the polymer droplets.

Thereby, the residence time is preferably adjusted by increasing the height of the polymer-rich phase of the polymer solution in the separator, preferably by reducing the polymer-phase outlet flowrate.

When the residence time of the polymer solution is at least the same or higher than the traveling time of the polymer droplets it can be ensured that the polymer droplets situated within the polymer-lean liquid phase have enough time to gravitate into the polymer-rich phase before being withdrawn from the separator.

The separator used in the method of the present invention preferably is a separator which is suitable to separate liquid-liquid two phase systems and vapour-liquid two phase systems. More preferably the separator is a vapour-liquid separator such as a flash separator. The vapour-liquid separator preferably can also be operated under higher pressures such as in the range of 30 to 300 barg in which a liquid-liquid two phase systems is obtained. The vapour-liquid separator preferably is equipped with conveying means such as pumps suitable for conveying both a polymer-lean vapour stream and a polymer-lean liquid stream from the upper region of the vapour-liquid separator.

In general, separators can be interchangeably used. However, two constraints need to be considered: (a) the design pressure of the separator and (b) the residence time needed to settle the polymeric material which usually is higher for liquid-liquid separators than for vapour-liquid separators.

When using a vapour-liquid separator which is suitable to separate liquid-liquid two phase systems and vapour-liquid two phase systems with the method of the present invention it is possible to chose the method of separation (either liquid-liquid separation or vapour liquid separation) depending on the characteristics of the polymer polymerized in the upstream solution polymerization process. As discussed above the particle diameter of the polymer, amongst others, also depends on its weight average molecular weight and its comonomer content. Thus, depending on these characteristics and the hole diameter of the distributor in the vapour-liquid separator and thus the resulting droplet diameter range together with the dimensions of the vapour-liquid separator which has an influence on the traveling time either a vapour-liquid separation or a liquid-liquid separation can be chosen in order to ensure minimum entrainment of the polymer in the polymer-lean stream.

Process

The present invention further provides a process for producing a polymer comprising the steps of:
  (a) Continuously polymerizing a monomer and optionally at least one comonomer in a solvent in a polymerization reactor to produce a polymer solution comprising the solvent, the polymer, unreacted monomer and optionally unreacted comonomer;
  (b) Continuously withdrawing the polymer solution from the polymerization reactor;
  (c) Heating the polymer solution;
  (d) Reducing the pressure of the heated polymer solution by an amount sufficient to separate the polymer solution into a polymer-rich liquid phase comprising the polymer and a polymer-lean liquid phase comprising the solvent, the unreacted monomer and optionally the unreacted comonomer;
  (e) Feeding the pressure-reduced polymer solution into a separator;
  (f) Reducing the entrainment of the polymer in the polymer-lean liquid phase according to the method as described above or below;
  (g) Withdrawing the polymer-rich liquid phase from the separator and recovering the polymer from the polymer-rich liquid phase; and
  (h) Withdrawing the polymer-lean liquid phase from the separator and directly recycling the polymer-lean liquid phase into the polymerization reactor.

Polymerization

The solution polymerization process is typically conducted in a solvent in which the monomer, eventual comonomers, eventual chain transfer agent and the polymer formed in course of the process are dissolved. Such processes are disclosed, among others, in WO-A-1997/036942, WO-A-2006/083515, WO-A-2008/082511, and WO-A-2009/080710.

The polymerization may be conducted in one or more polymerization reactors. It is obvious that where the text refers to one polymerization reactor it can be equally applied to more than one reactor, and in specific to any one of the reactors. In addition, where a reference to more than one reactor has been made it can be equally applied to one polymerization reactor.

In the polymerization reactor preferably olefin monomers having two or more carbon atoms, one or more catalyst systems, optionally one or more comonomers, more preferably alpha-olefin comonomers having two to 12 carbon atoms, optionally one or more chain transfer agents, and optionally one or more diluents or solvents are used for conducting a polymerization. Thus, the polymerization system for each reactor is in its dense fluid state and comprises the olefin monomers, any comonomer present, any diluent or solvent present, any chain transfer agent present, and the polymer product.

The olefin monomer is an olefin having two or more carbon atoms, preferably an alpha olefin having two or more carbon atoms, more preferably from 2 to 12 carbon atoms. Still more preferably the olefin monomer is selected from the group consisting of ethylene, propylene and 1-butene. Especially preferably the olefin monomer is ethylene or propylene.

One or more comonomers are optionally and preferably present in at least one of the polymerization reactors. The comonomer is preferably selected from the group consisting of alpha-olefins different from the olefin monomer having from 2 to 12 carbon atoms; polyenes, such as non-conjugated alpha-omega-dienes, having from 4 to 10 carbon atoms, cyclic olefins having from 6 to 20 carbon atoms and cyclic polyenes having from 6 to 20 carbon atoms. Preferably, the comonomer is selected from the group of alpha-olefins different from the olefin monomer having from 2 to 10 carbon atoms, such as 1-butene, 1-hexene and 1-octene when the olefin monomer is ethylene; and ethylene, 1-butene and 1-hexene when the olefin monomer is propylene.

The polymerization catalyst may be any catalyst known in the art which is capable of polymerizing the monomer and the optional comonomer. Thus, the polymerization catalyst may be a Ziegler-Natta catalyst as disclosed in EP-A-280352, EP-A-280353 and EP-A-286148, or it may be a metallocene catalyst as disclosed in WO-A-1993025590, US-A-5001205, WO-A-1987003604 and US-A-5001244, or it may be a combination of these. Also other suitable catalysts, such as late transition metal catalysts, can be used.

A chain transfer agent may be used in one or all of the polymerization reactors for controlling the molecular weight of the polymer as it is known in the art. A suitable chain transfer agent is, for instance, hydrogen. By maintaining different concentrations of the chain transfer agent in the two reactors it is possible to produce a polymer blend having a broadened molecular weight distribution.

It is self-explaining that the reaction conditions applied within the different reactors need not be the same but may be different when compared with each other. This allows the production of different polymers which finally are blended together. As the reaction conditions can be adjusted completely independent for the further reactor(s), the options for varying the microstructure of the polymers to be blended are very broad.

The solvent is suitably present in the polymerization process. The solvent may be any suitable straight-chain or branched alkyl having from 3 to 20 carbon atoms, a cyclic alkyl, optionally having alkyl substituents, having from 5 to 20 carbon atoms, or an aryl, optionally having alkyl substituents, having from 6 to 20 carbon atoms, or a mixture of two or more of the above-listed compounds. The solvent must be inert towards the polymerization catalyst and the monomers. Further, it should be stable in the polymerization conditions. It further must be able to dissolve the monomer, the eventual comonomers, the eventual chain transfer agent and the polymer in the polymerization conditions.

The temperature in the polymerization reactor(s) is such that the polymer formed in the polymerization reaction is completely dissolved in the reaction mixture comprising the solvent, the comonomer(s), the chain transfer agent and the polymer. Then, for instance, the first solution is formed in the first polymerization reactor. The temperature is suitably greater than the melting temperature of the polymer. Thus, when the polymer is a homo- or copolymer of ethylene the temperature is suitably from 120° C. to 240° C., such as from 140° C. to 230° C., most preferably from 150° C. to 220° C., depending on the content of comonomer units in the polymer. When the polymer is a homo- or copolymer of propylene the temperature is suitably from 120° C. to 300° C., such as from 140° C. to 275° C., most preferably from 150° C. to 250° C., depending on the content of comonomer units in the polymer.

The pressure in the polymerization reactor(s) depends on the temperature, on one hand, and the type and the amount of the comonomer, on the other hand. The pressure is suitably from 50 to 300 bar, preferably from 60 to 250 bar and more preferably from 70 to 200 bar. The residence time is short, typically less than 20 minutes.

The process is suitably operated continuously. Thereby streams of monomer, catalyst, and when present streams of comonomer, chain transfer agent and solvent are passed to the polymerization reactor. A product stream, such as the first stream of the first solution or the second stream of the second solution, comprising the unreacted monomer, dissolved polymer and eventual unreacted comonomer and chain transfer agent as well as the eventual solvent is withdrawn from the reactor.

A product stream, such as the first stream of the first solution or the second solution, is withdrawn from the polymerization reactor. The streams may be passed into the subsequent process stages, such as to the heating steps or to the separation step, as separate streams or they may be combined at a suitable location.

The polymer solution stream preferably contains from 10 to 35% by weight polymer, more preferably from 12 to 30% by weight polymer, most preferably from 15 to 25% by weight polymer, based on the total weight content of polymer solution stream.

Heating Step(s)

Before feeding the polymer solution stream from the reactor to the separator usually the stream is preheated in at least one heating step, preferably in two heating stages including a pre-heating stage and a final-heating stage.

Typically the temperature of the polymer solution stream before entering the first heating step is from 120° C. to 250° C.

After the one or two heating steps the temperature of the polymer solution stream before entering the separator is typically from 200° C. to 300° C., preferably from 210° C. to 270° C. and more preferably from 210° C. to 260° C.

It is preferred that the pressure of the polymer solution stream is not substantially affected by the heating step(s).

The pressure is suitably from 50 to 300 bar, preferably from 50 to 250 bar and more preferably from 70 to 200 bar.

Separation Step

The polymer solution stream from the reactor is fed to separator. Thereby, the temperature and pressure will be adjusted such that a two phase system with two liquid phases is obtained. The polymer droplets thereby preferably gravitate into the polymer-rich liquid phase having a higher relative density which comprises a part of the eventual solvent and a part of the eventual unreacted comonomer while most part of the unreacted monomer, eventual unreacted chain transfer agent, eventually a part of the unreacted comonomer, and eventually, a part of the solvent form the polymer-lean liquid phase having a lower relative density.

The temperature in the separation step is suitably within the range of from 120° C. to 270° C., preferably from 140° C. to 260° C. and more preferably from 150° C. to 250° C.

The pressure in the flash separator is typically from 1 to 500 bar, suitably 2 to 400 bar, most suitably 3 to 300 bar.

In an embodiment in which the separation step is a vapour-liquid separation the pressure in the separation step is preferably from 1 to 15 bar, more preferably from 2 to 12 bar and most preferably from 5 to 10 bar.

The polymer content in polymer-rich liquid stream withdrawn from the separator is typically from 40 to 90% by weight, preferably from 50 to 80% by weight and most preferably from 60 to 75% by weight, based on the total weight content of the polymer-rich liquid stream.

The polymer-rich liquid stream withdrawn from the separator can be recovered by any method known in the art. Thereby, the polymer-rich liquid step can be subjected to a further downstream separation step which can be a liquid-liquid separation step or a vapour-liquid separation step and preferably is a vapour-liquid separation step.

Depending on the polymer content in the polymer-rich liquid stream such a further downstream separation step can also be omitted.

Further recovery steps can be one or more compounding steps such as extrusion or mixing step(s) in which the polymer is compounded, optionally together with usual additives to form a compounded polymer composition.

Due to the minimum amount of entrained polymer in the polymer-lean liquid stream withdrawn from the separator the polymer-lean phase can be directly recycled into the polymerization reactor, preferably without additional separation steps for separating entrained polymer.

Suitably, the pressure and the temperature of the polymer-lean liquid stream are adjusted to the conditions of the polymerization reaction in the reactor before entering the polymerization reactor.

Use

The present invention further provides the use of the method of reducing the entrainment of polymer in the polymer-lean liquid phase in a separator as described above or below for determining the minimum residence time of the polymer solution in the separator required to ensure efficient separation of a polymer solution into a polymer-rich phase comprising the polymer and a polymer-lean phase comprising solvent, unreacted monomer and optionally unreacted comonomer with the maximum fraction of polymer collected in the polymer-rich phase.

Thereby, the polymer solution is continuously withdrawn from a polymerization reactor, heated and expanded in order to reduce pressure before being introduced into the separator.

As discussed above the separator is preferably suitable to separate liquid-liquid two phase systems and vapour-liquid two phase systems. Preferably the separator is a vapour-liquid separator which is suitable to separate liquid-liquid two phase systems and vapour-liquid two phase systems with the method of the present invention.

When using a vapour-liquid separator which is suitable to separate liquid-liquid two phase systems and vapour-liquid two phase systems with the method of the present invention it is possible to chose the method of separation (either liquid-liquid separation or vapour liquid separation) depending on the minimum residence time of the polymer solution in the separator which also depends on the characteristics of the polymer polymerized in the upstream solution polymerization process. As discussed above the particle diameter of the polymer, amongst others, also depends on its weight average molecular weight and its comonomer content. Thus, depending on these characteristics and the mesh size of the de-entrainment mesh pad in the vapour-liquid separator and thus the resulting droplet diameter together with the dimensions of the vapour-liquid separator which has an influence on the traveling time either a vapour-liquid separation or a liquid-liquid separation can be chosen in order to ensure minimum entrainment of the polymer in the polymer-lean stream.

Benefits of the Invention

The method of the present invention provides a flexible method for efficiently separating polymer from a polymer solution stream.

The inventive method provides means to determine the minimum residence time of the polymer solution in the separator required to ensure efficient separation of a polymer solution into a polymer-rich phase comprising the polymer and a polymer-lean phase.

The liquid-liquid separation in accordance with the method of the present invention provides an efficient separation with a significant reduction of entrained polymer in the polymer-lean liquid phase.

EXAMPLES

Example 1

Computer simulations were performed using Aspen 8.8 computer software. In the simulation a solution withdrawn from the reaction stage containing 21.2 wt % of a copolymer of ethylene and 1-octene (density of 885 kg/m$^3$, MFR$_2$ of 6 g/10 min, molecular weight distribution Mw/Mn of about 2), 0.9 wt % of unreacted ethylene monomer, and 77.9 wt % of n-hexane solvent together with unreacted 1-octene comonomer in comparative example CE1 was separated in a flash separator (vapour-liquid separator). Thereby, the temperature of the solution stream was assumed to be 230° C. before entering the flash separator and the pressure was assumed to be 90 barg before entering the flash separator and 7 barg in the flash separator. In example E2 was separated in a liquid-liquid separator. Thereby, the temperature of the solution stream was assumed to be 190° C. before entering the liquid-liquid separator and the pressure was assumed to be 45 barg in the liquid-liquid separator. Comparison of the process flows are shown in Table 1.

TABLE 1

|  | CE1 | E2 |
|---|---|---|
| Temperature before entering separator [° C.] | 230 | 190 |
| Top stream | Vapour | Liquid |
| Temperature [° C.] | 176 | 176 |
| Pressure [barg] | 7 | 45 |
| % of polymer in top stream [wt %] | 0 | 0 |
| % of solvent in top stream [wt %] | 72 | 66 |
| Bottom stream | Liquid | Liquid |
| Temperature [° C.] | 176 | 176 |
| Pressure [barg] | 7 | 45 |
| % of polymer in bottom stream [wt %] | 68 | 39 |
| % of solvent in bottom stream [wt %] | 13 | 37 |

It can be seen that by means of a liquid-liquid separator separation is obtainable with higher energy efficiency since the separation takes place at a lower temperature and a higher pressure in the separator compared to a vapour-liquid separator.

Example 2

For the simulations of examples CE1 (flash separator) and E2 (liquid-liquid separator) using the same polymeric material the termination velocity is determined according to formulas (I) and (II) as described above and in claim 5.

Figure 3:
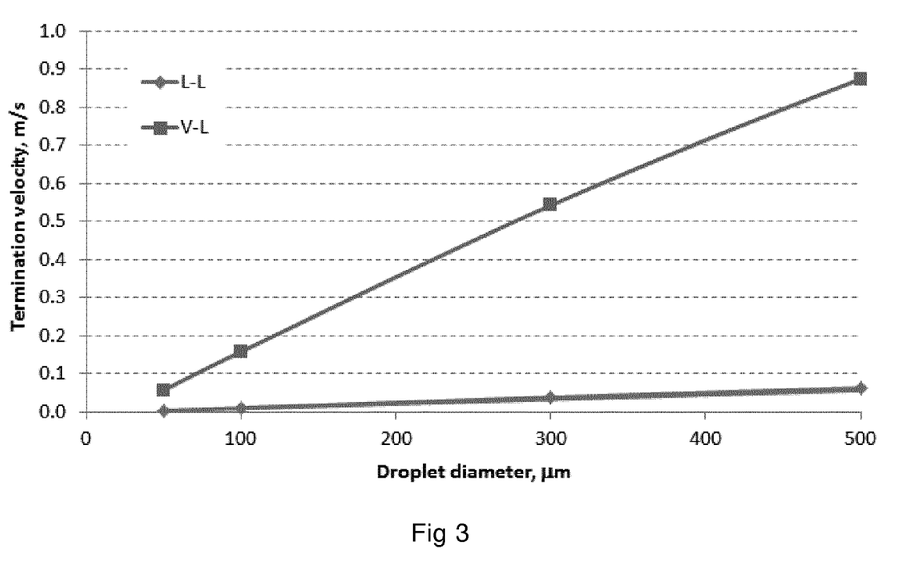
FIG. 3 shows the termination velocity as a function of the polymer droplet diameter for both liquid-liquid separation (L-L) and vapour-liquid separation (V-L).

The termination velocities are shown in FIG. 3 as function of the polymer droplet diameter for both liquid-liquid separation (L-L) for example E2 and vapour-liquid separation (V-L) for comparative example CE1.

Due to the relatively high density and viscosity of the polymer-lean phase in the case of liquid-liquid (L-L) separator, the termination velocity is much smaller than the corresponding one in the flash (V-L) separator. As an example, for a 100 μm polymer droplet, the termination velocity is around 0.01 m/s in the liquid-liquid separator. However, this velocity is increased to about 0.16 m/s when polymer-lean phase is a light vapor phase as in the flash separator.

Example 3

From the above determined termination velocities the traveling time of the polymer droplets with diameters of 50 μm, 100 μm, 300 μm and 500 μm is estimated as the ratio of the height of the separator to the termination velocity.

The traveling times of the polymer droplets of examples CE1 and E2 are listed below in Table 2:

|  | Traveling time [min] | |
|---|---|---|
| Droplet diameter [μm] | CE1 (V-L) | E2 (L-L) |
| 50 | 3.5 | 57 |
| 100 | 1.3 | 20 |
| 300 | 0.4 | 5.3 |
| 500 | 0.23 | 3.2 |

Considering a separator of average residence time around 20 minutes, Table 2 above shows the average traveling times of droplets of different diameter inside the flash separator (V-L) for example CE1 and the liquid-liquid separator (L-L) for example E2. As it can be seen, all droplets with diameter of 100 μm or smaller will be entrained in the polymer-lean phase when the separation takes place in a liquid-liquid separator (E2). However, droplets as small as 50 μm are expected not to be entrained in the polymer-lean phase when flash separator is utilized (CE1).

Example 4

The traveling times the different droplet diameters for example E2 above in Table 2 are now plotted into graphs showing the traveling time of the polymer droplets as a function of the polymer droplet diameter in the liquid-liquid separator. Thereby, in FIG. 4 and FIG. 5 the abbreviation HUT means hold-up time which in this case is synonymous for traveling time.

Figure 4:
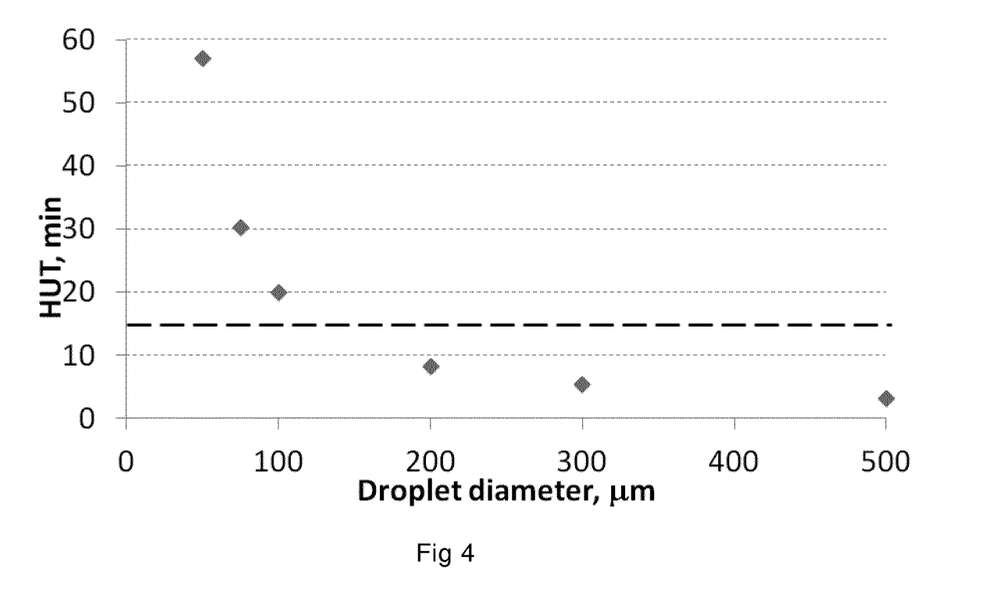
FIG. 4 shows the traveling time of the polymer droplets as a function of the polymer droplet diameter in a liquid-liquid separator with an average residence time of 15 min.

In FIG. 4 an average residence time of the polymer droplets of 15 min is assumed. As shown in FIG. 4, only polymer droplets with a diameter of equal or greater than about 120 μm are not entrained in the polymer-lean phase.

Figure 5:
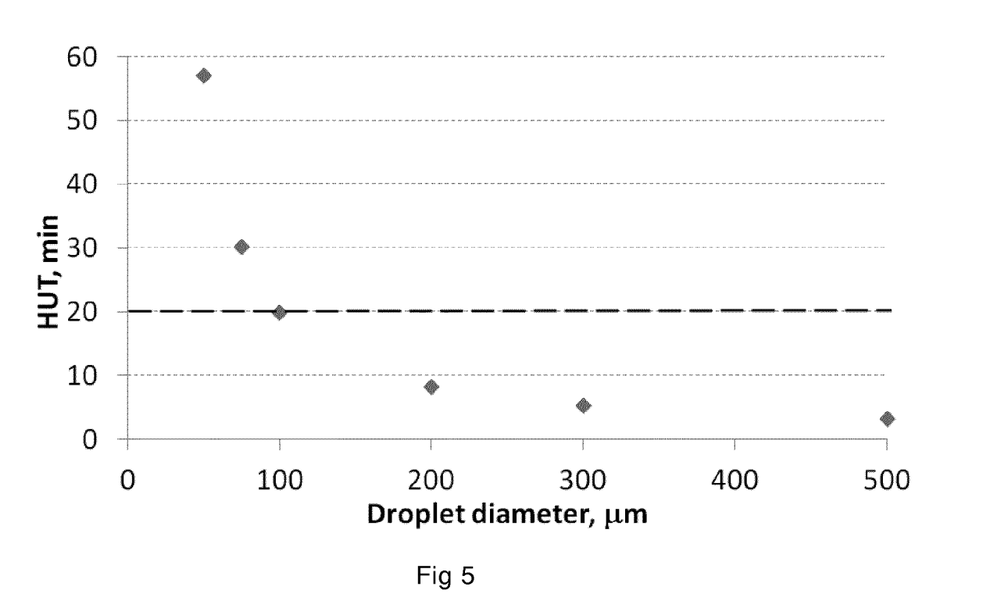
FIG. 5 shows the traveling time of the polymer droplets as a function of the polymer droplet diameter in a liquid-liquid separator with an average residence time of 20 min.

In FIG. 5 the average residence time of the polymer droplets is increased to 20 min by increasing the height of the polymer-rich liquid phase in the liquid-liquid separator. As shown in FIG. 5, the droplets with a diameter of around 100 μm or bigger are withdrawn with the polymer-rich phase.

It can be seen from FIGS. 4 and 5 that for completely withdrawing polymer droplets with a particle diameter of 50 μm the average residence time in the liquid-liquid separator has to be increased to at least 57 min.

Thereby, in both FIGS. 4 and 5 the average residence time is indicated by means of a dashed line.

The invention claimed is:

1. A method of reducing entrainment of polymer in a polymer-lean liquid phase in a separator, comprising the steps of:
    setting a diameter range of polymer droplets in a polymer solution entering the separator;
    (ii) estimating a traveling time of the polymer droplets in the separator; and
    (iii) adjusting a residence time of the polymer solution in the separator to be at least the traveling time of the polymer droplets in the polymer-lean liquid phase;
    wherein the diameter range of the polymer droplets is set by selecting a hole size of a distributor inside the separator.

2. The method according to claim 1, wherein a diameter of the polymer droplets is at least 50 μm.

3. The method according to claim 1, wherein the traveling time is estimated from a termination velocity of the polymer droplets.

4. The method according to claim 3, wherein the termination velocity $u_T$ of the polymer droplets is calculated according to the following formula:

$$u_T = \sqrt{\frac{4g(\rho_d - \rho_f)d_p}{3\rho_f CD}} \quad (I)$$

with a droplet density $\rho_d$ being in a range of 700 to 900 kg/m$^3$, a fluid density $\rho_f$ being in a range of 350 to 700 kg/m$^3$, a droplet diameter determined according to step (i) and a Drag Coefficient CD determined from a Reynolds number Re according to the following formula:

$$CD = \frac{24}{Re}[1 + 0.173 Re^{0.657}]. \quad (II)$$

5. The method according to claim 3, wherein the termination velocity $u_T$ is at least 0.001 m/s.

6. The method according to claim 1, wherein the residence time of the polymer solution in the separator is adjusted by increasing a height of a polymer-rich phase of the polymer solution in the separator.

7. The method according to claim 1, wherein the polymer-lean liquid phase withdrawn from the separator is substantially free of polymer.

8. The method according to claim 1, wherein the separator is suitable to separate liquid-liquid two phase systems and vapour-liquid two phase systems.

9. The method according to claim 1, wherein the polymer is an alpha-olefin homo- or copolymer comprising a monomer and optionally at least one comonomer all selected from ethylene or C3 to C12 alpha-olefins.

10. A process for producing a polymer comprising the steps of:
   (a) continuously polymerizing a monomer and optionally at least one comonomer in a solvent in a polymerization reactor to produce a polymer solution comprising the solvent, the polymer, unreacted monomer and optionally unreacted comonomer;
   (b) continuously withdrawing the polymer solution from the polymerization reactor;
   (c) heating the polymer solution;
   (d) reducing the pressure of the heated polymer solution by an amount sufficient to separate the polymer solution into a polymer-rich liquid phase comprising the polymer and a polymer-lean liquid phase comprising the solvent, the unreacted monomer and optionally the unreacted comonomer;
   (e) feeding the pressure-reduced polymer solution into a separator;
   (f) reducing the entrainment of the polymer in the polymer-lean liquid phase by:
      (i) setting a diameter range of polymer droplets in a polymer solution entering the separator;
      (ii) estimating a traveling time of the polymer droplets in the separator; and
      (iii) adjusting a residence time of the polymer solution in the separator to be at least the traveling time of the polymer droplets in the polymer-lean liquid phase;
   (g) withdrawing the polymer-rich liquid phase from separator and recovering the polymer from the polymer-rich liquid phase; and
   (h) withdrawing the polymer-lean liquid phase from the separator and directly recycling the polymer-lean liquid phase into the polymerization reactor.

11. The process according to claim 10, wherein the monomers and optional comonomers are selected from alpha-olefin monomers with 2 to 12 carbon atoms.

12. A method for determining a minimum residence time of a polymer solution in a separator required to ensure efficient separation of a polymer solution into a polymer-rich phase comprising the polymer and a polymer-lean phase comprising solvent, unreacted monomer and optionally unreacted comonomer with the maximum fraction of polymer collected in the polymer-rich phase, the process comprising:
   setting a diameter range of polymer droplets in a polymer solution entering the separator;
   estimating a traveling time of the polymer droplets in the separator; and
   adjusting a residence time of the polymer solution in the separator to be at least the traveling time of the polymer droplets in the polymer-lean phase;
   wherein the diameter range of the polymer droplets is set by selecting a hole size of a distributor inside the separator.

13. The method according to claim 12, wherein the polymer solution is continuously withdrawn from a polymerization reactor, heated and expanded in order to reduce pressure before being introduced into the separator.

14. The method according to claim 12, wherein it is decided to use the separator for vapour-liquid separation or for liquid-liquid separation depending on the minimum residence time which depends on the weight average molecular weight and the optional comonomer content of the polymer in the polymer solution.

* * * * *